United States Patent
Allen et al.

(10) Patent No.: US 7,146,360 B2
(45) Date of Patent: Dec. 5, 2006

(54) METHOD AND SYSTEM FOR IMPROVING RESPONSE TIME FOR DATABASE QUERY EXECUTION

(75) Inventors: Terry Dennis Allen, San Jose, CA (US); Hsiuying Cheng, Fremont, CA (US); Fen-Ling Lin, San Jose, CA (US); Akira Shibamiya, Los Altos, CA (US); Annie S. Tsang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 10/323,257

(22) Filed: Dec. 18, 2002

(65) Prior Publication Data
US 2004/0122802 A1     Jun. 24, 2004

(51) Int. Cl.
*G06F 17/30*    (2006.01)
*G06F 7/00*     (2006.01)
(52) U.S. Cl. .............................................. 707/5; 707/3
(58) Field of Classification Search .......... 707/1–104.1
See application file for complete search history.

(56) References Cited

U.S. PATENT DOCUMENTS

| | | | |
|---|---|---|---|
| 5,121,502 A | 6/1992 | Rau et al. | |
| 5,210,870 A * | 5/1993 | Baum et al. | 707/7 |
| 5,283,896 A | 2/1994 | Temmyo et al. | 718/104 |
| 5,317,743 A | 5/1994 | Imai et al. | |
| 5,325,525 A | 6/1994 | Shan et al. | 718/104 |
| 5,524,242 A | 6/1996 | Aida et al. | |
| 5,668,897 A * | 9/1997 | Stolfo | 382/283 |
| 5,845,113 A * | 12/1998 | Swami et al. | 707/7 |
| 6,009,265 A | 12/1999 | Huang et al. | 703/3 |
| 6,106,575 A | 8/2000 | Hardwick | 717/119 |
| 6,289,334 B1 * | 9/2001 | Reiner et al. | 707/3 |
| 6,292,822 B1 | 9/2001 | Hardwick | 718/105 |
| 6,519,593 B1 * | 2/2003 | Matias et al. | 707/7 |
| 2003/0093442 A1 * | 5/2003 | Mogi et al. | 707/203 |

OTHER PUBLICATIONS

U.S. Pat. Appl. Publication; Pub. No: US 2002/0002578 A1: Pub. Date: Jan. 3, 2002; Scheduling Apparatus Performing Job Scheduling of a Parallel Computer System, Yamashita.

* cited by examiner

*Primary Examiner*—Don Wong
*Assistant Examiner*—Linh Black
(74) *Attorney, Agent, or Firm*—Sawyer Law Group LLP

(57) ABSTRACT

Aspects for improving response time for database query execution are described. The aspects include comparing an estimate of sort pages needed for a database query against at least one threshold. A determination of whether to perform a parallel sort for the database query based on the comparison occurs, wherein response time improvement by the parallel sort is balanced against resource overhead of the parallel sort.

12 Claims, 2 Drawing Sheets

US 7,146,360 B2

METHOD AND SYSTEM FOR IMPROVING RESPONSE TIME FOR DATABASE QUERY EXECUTION

FIELD OF THE INVENTION

The present invention relates to database systems, and more particularly to improving response time for database query execution.

BACKGROUND OF THE INVENTION

Of particular interest in today's computing environment are relational database applications. Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to link information from multiple tables or views together to perform complex sets of procedures with a single statement.

In order to improve the RDBMS performance in evaluating and satisfying queries, the inherent parallelism in multiple CPUs or I/O devices available in a computer system during execution can be exploited. For example, when performing a sequential table scan of a table that is stored across multiple I/O devices, the table scans on the separate I/O devices can be performed at the same time to reduce I/O time by utilizing the concurrency of multiple asynchronous I/O operations on the devices. Parallelism can also be exploited by using multiple CPUs to evaluate the data according to criteria provided by a query, so that total elapsed time can be lowered by overlapping query processing by the multiple CPUs. A more complex parallelism operation involves partitioning the query execution plan among CPUs and executing operations in parallel.

While parallelism can exploit the capabilities of system components, such exploitation may increase the resource utilization to a point that there is not a significant benefit realized. For example, parallel execution of a task, such as a sort, generates sub-tasks or child-tasks that each require workfile usage and virtual storage consumption. Such resource consumption can cause resource contention among the subtasks and can limit resource availability for other tasks also being executed within the same RDBMS. Thus, a trade-off exists between improved response time and resource overhead for parallel task execution.

Accordingly, a need exists for a manner of balancing response time against resource utilization to improve database query execution. The present invention addresses such a need.

SUMMARY OF THE INVENTION

Aspects for improving response time for database query execution are described. The aspects include comparing an estimate of sort pages needed for a database query against at least one threshold. A determination of whether to perform a parallel sort for the database query based on the comparison occurs, wherein response time improvement by the parallel sort is balanced against resource overhead of the parallel sort.

Through the present invention, a straightforward approach is provided that balances the overhead of resource utilization against the potential improvement in elapsed time for sort operations in query executions. These and other advantages of the aspects of the present invention will be more fully understood in conjunction with the following detailed description and accompanying drawings.

DETAILED DESCRIPTION

The present invention relates to improving response time for database query execution. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
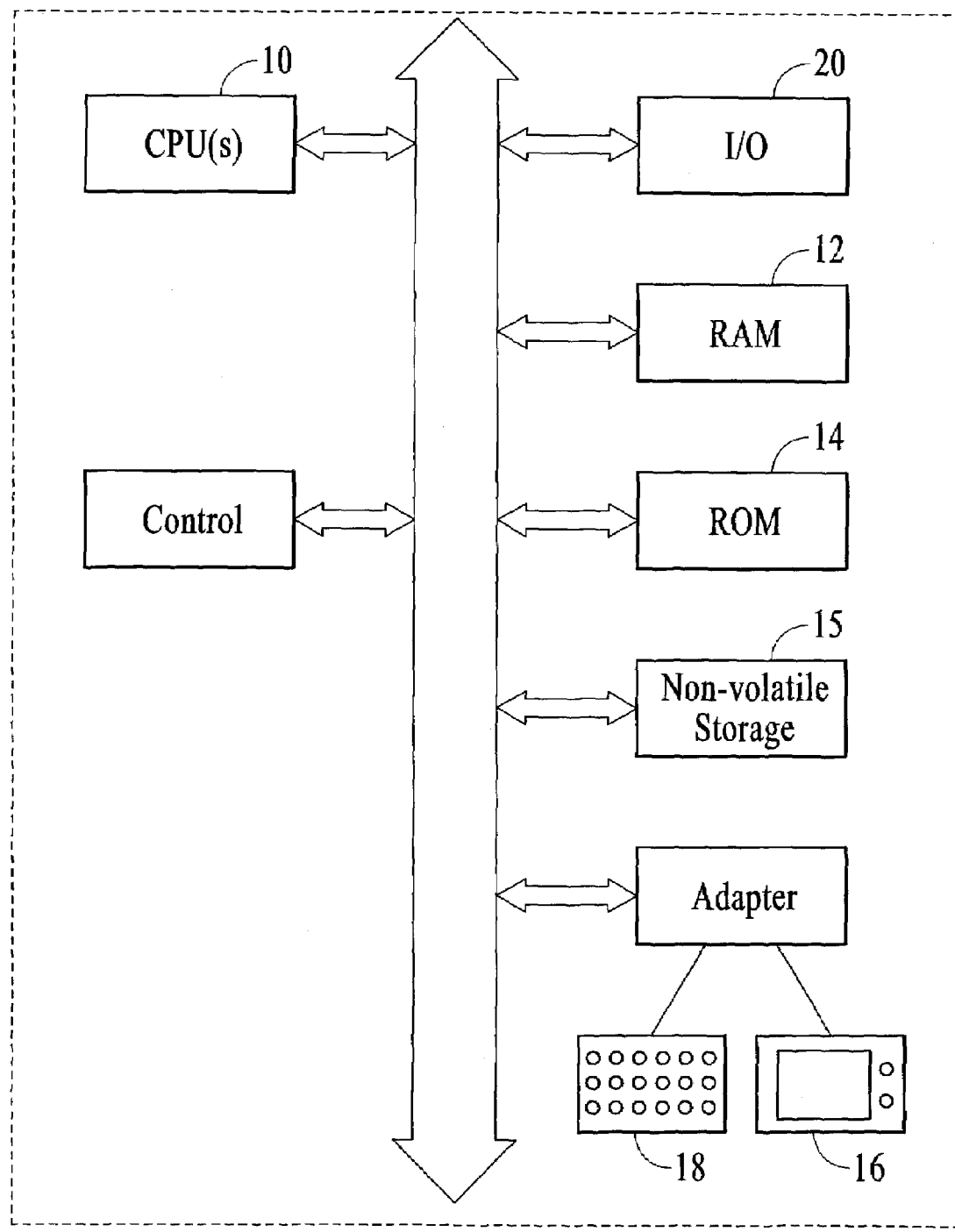
FIG. 1 illustrates an overall block diagram of a data processing system in accordance with the present invention.

A representation of a data processing system block diagram for implementing the method and system of the present invention is shown in FIG. 1. The data processing system includes one or more processors or CPU(s) 10, a random access memory or RAM 12, a read only memory or ROM 14, at least one non-volatile storage device 15, a computer display monitor 16 and a keyboard 18. One or more I/O devices 20 are connected to the processor 10. A database user or programmer enters a query to access data stored in the non-volatile storage 15. The query can be entered directly or as part of a program. A relational database management system, RDBMS, (not shown) operates within the data processing system to achieve query execution, as is well understood by those skilled in the art.

There are many variations of the computer system shown in FIG. 1 known to those skilled in the art for providing the database management system used in the present invention. The invention specified may be implemented using standard programming or engineering techniques. The resulting program or programs may be stored on disk, diskettes, memory cards, ROM or any other memory device. For execution, the program may be copied into the RAM of the computer system. One skilled in the art of computer science will easily be able to combine the software as described with appropriate general purpose or special purpose hardware to create a computer system embodying the invention.

As mentioned hereinabove, query execution by the RDBMS often employs parallelism to take advantage of the system resources and improve response time. In accordance with the present invention, the potential benefit of improved response time for a parallel sort in a database query execution by the RDBMS is balanced against the overhead of parallel execution. Specifically, parallel sort is disabled in cases where the increased overhead in terms of workfile and virtual storage consumption does not outweigh the potential improvement in elapsed time, as described with reference to FIG. 2.

Figure 2:
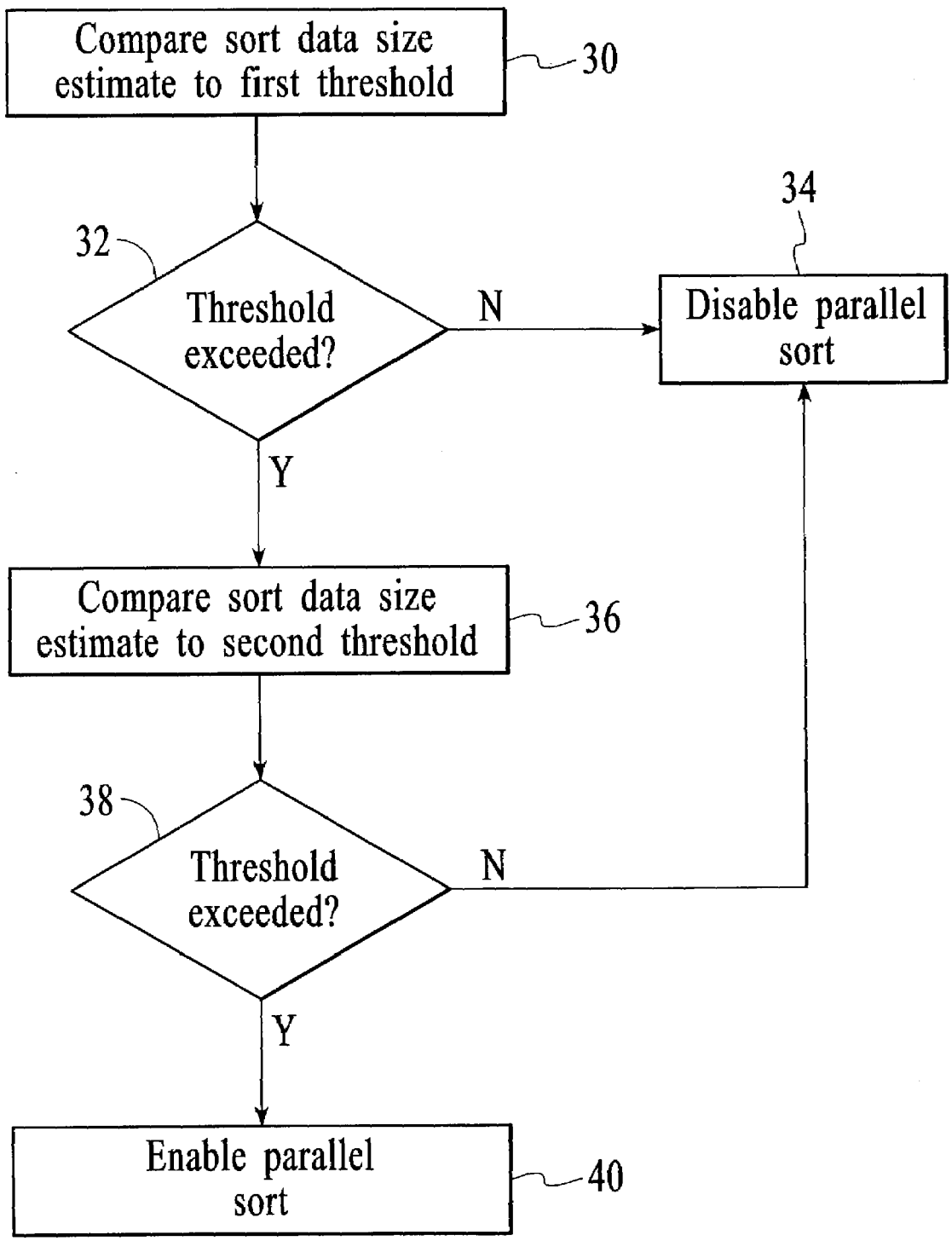
FIG. 2 illustrates a block flow diagram of a process of improving query response time in accordance with the present invention.

FIG. 2 illustrates an overall block flow diagram of a method for utilizing sort cost estimation to improve response tune during query execution. When executing both single-table and multi-table parallel sort, such as by DB2 for z/OS V8 from International Business Machines, Inc. of Armonk, N.Y., the process includes comparing the internal estimate for number of sort pages needed, which is normally determined by the RDBMS, against a first threshold for the total data size (step 30), e.g., a total data size of 2 MB (megabytes). If the internal estimate falls below the first threshold and the threshold is not exceeded (as determined via step 32), the parallel sort is disabled (step 34). If the internal estimate does not fall below the first threshold, the internal estimate for number of sort pages is compared against a second threshold for the sort data size per parallel degree, i.e., per child task or parallel subtask, (step 36), e.g., 100kB (kilobytes) per child task. If the internal estimate falls below the second threshold, as determined via step 38, the parallel sort is disabled (step 32). If the internal estimate does not fall below the second threshold and the second threshold is exceeded, the parallel sort is enabled (step 40).

By way of example, the following describes the points of decisions in two SQL query examples.
SELECT*FROM Ta, Tb WHERE a1=b1 ORDER BY a2; represents a first example SQL query.

Assume that the database has chosen a (sequential) access plan like the following:

$$Ta \xrightarrow{SMJ} Tb \dashrightarrow <\text{order by sort}>$$

In this sequential access plan, Ta is joined to Tb via a sort merge join (SMJ), and the result of joining Ta to Tb is sorted according to a2 order. Assume that Ta requires sorting, Tb requires sorting, and the composite table resulting from joining Ta to Tb requires sorting due to the ORDER BY clause.

Therefore, the estimated sort costs based on sort data size would be compared to the sort thresholds to determine:
(1) whether to execute the sort of Ta in parallel (i.e. multiple child tasks each performing a portion of the sort), or sequentially;
(2) whether to execute the sort of Tb in parallel or sequentially; and
(3) whether to execute the sort of the composite table resulting from joining Ta to Tb in parallel or sequentially.

An additional example involving a nested loop join (NLJ) is described herein below:
select Ta.c1, count(*), sum(Th.c22) from Ta, Tb, Tc where Ta.c1=Tb.c1 and Tb.c2=Tc.c2 and Ta.c11<=300 Group by Ta.c1;

$$Ta \xrightarrow{NLJ} Tb \xrightarrow{NLJ} Tc \dashrightarrow <\text{group by sort}>$$

no sort    sort-comp    group by sort

In this example, the decision points for the threshold comparison are (1) the sort-composite (sort-comp) and (2) the group by sort.

Thus, through the present invention, a straightforward approach is provided that balances the overhead of resource utilization against the potential improvement in elapsed time for sort operations in query executions. More particularly, the present invention determines whether a parallel sort should be enabled based on an estimate of sort pages needed. Thus, for relatively small sorts that are not expected to consume much time, the parallel sort is disabled, since there is limited additional benefit of executing the sort as a parallel sort and greater benefit to avoiding its concomitant workfile and virtual storage consumption.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving response time for database query execution, the method comprising:
   comparing a first estimate of a total data size of all sort pages needed for a database query against a first pre-determined data size; and
   determining whether to perform a parallel sort for the database query based on the comparison, wherein response time improvement by the parallel sort is balanced against resource overhead of the parallel sort;
   performing the parallel sort responsive to the first estimate exceeding the first pre-determined data size to reduce a response time for execution of the database query; and
   displaying a result of the execution of the database query to a database user.

2. The method of claim 1, wherein comparing further comprises comparing one or more second estimates corresponding to an estimated data size of a respective sort page against a second predetermined data size when the first estimate exceeds the first pre-determined data size.

3. The method of claim 2, wherein determining whether to perform a parallel sort further comprises performing the parallel sort when one or more of the second estimates exceeds the second pre-determined data size.

4. A system for improving response time for database query execution, the system comprising:
   a data processing system capable of parallel execution of database queries; and
   a relational database management system operating on the data processing system, the database management system operable to compare a first estimate of a total data size of all sort pages needed for a database query against a first pre-determined data size, and determine whether to perform a parallel sort for the database query based on the comparison, wherein response time improvement by the parallel sort is balanced against resource overhead of the parallel sort;
   performing the parallel sort responsive to the first estimate exceeding the first pre-determined data size to reduce a response time for execution of the database query; and
   a display monitor to display a result of the execution of the database query to a database user.

5. The system of claim 4, wherein the database management system further compares one or more second estimates corresponding to a data size of a respective sort page against a second predetermined data size when the first estimate exceeds the first pre-determined data size.

6. The system of claim 5, wherein the database management system further performs the parallel sort when one or more of the second estimates exceeds the second we-determined data size.

7. A computer readable medium containing program instructions for improving response time for database query execution, the program instructions comprising:
   comparing a first estimate of a total data size of all sort pages needed for a database query against a first pre-determined data size; and
   determining whether to perform a parallel sort for the database query based on the comparison, wherein response time improvement by the parallel sort is balanced against resource overhead of the parallel sort;
   performing the parallel sort responsive to the first estimate exceeding the first pre-determined data size to reduce a response time for execution of the database query; and
   display a result of the execution of the database query to a database user.

8. The computer readable medium of claim 7, wherein comparing further comprises comparing one or more second estimates corresponding to an estimated data size of a respective sort page against a second predetermined data size when the first estimate exceeds the first pre-determined data size.

9. The computer readable medium of claim 8, wherein determining whether to perform a parallel sort further comprises performing the parallel sort when one or more of the second estimates exceeds the second pre-determined data size.

10. A computer-implemented method for performing parallel execution of a task in a database system, the method comprising:
    receiving a task to be executed for a database query in the database system;
    comparing a first estimate of a total data size of all parallel sub-tasks needed to execute the task against a first pre-determined data size;
    comparing one or more second estimates corresponding to an estimated data size of a respective parallel sub-task against a second pre-determined data size, the second pre-determined data size being smaller than the first pre-determined data size;
    if the first estimate exceeds the first pre-determined data size and if one or more of the second estimates exceeds the second pre-determined data size then,
    generating a plurality of sub-tasks for satisfying the database query based on the received task; and
    executing the generated sub-tasks in parallel within the database system;
    display a result of the execution of the database query to a database user.

11. The method of claim 10, wherein the received task comprises a sort.

12. The method of claim 10, wherein the first pre-determined data size is (2) megabytes and the second pre-determined data size is (100) kilobytes.

* * * * *